United States Patent
Mimura

[11] Patent Number: 6,032,045
[45] Date of Patent: Feb. 29, 2000

[54] METHOD OF AUTOMATIC FREQUENCY ASSIGNMENT IN A MOBILE COMMUNICATION SYSTEM

[75] Inventor: Yukie Mimura, Tokyo, Japan

[73] Assignee: NEC Corporation, Tokyo, Japan

[21] Appl. No.: 08/915,274

[22] Filed: Aug. 20, 1997

[30] Foreign Application Priority Data

Aug. 21, 1996 [JP] Japan .................................. 8-219937

[51] Int. Cl.[7] .................................................. H04Q 7/34
[52] U.S. Cl. ........................... 455/446; 455/62; 455/67.1; 455/67.3
[58] Field of Search ............................. 455/62–63, 67.1, 455/67.3, 450, 452, 454, 446–447, 513–514, 501

[56] References Cited

U.S. PATENT DOCUMENTS

| | | | |
|---|---|---|---|
| 5,038,399 | 8/1991 | Bruckert | 455/447 |
| 5,157,709 | 10/1992 | Ohteru | 455/452 X |
| 5,212,831 | 5/1993 | Chuang | 455/54.1 |
| 5,475,868 | 12/1995 | Duque-Anton et al. | 455/62 |
| 5,551,064 | 8/1996 | Nobbe et al. | 455/62 |
| 5,561,839 | 10/1996 | Osterberg et al. | 455/446 |
| 5,561,841 | 10/1996 | Markus | 455/422 X |
| 5,737,705 | 4/1998 | Ruppel et al. | 455/452 |

OTHER PUBLICATIONS

Motorola, Inc., Automatic Port Frequency Assignment, JTC (AIR)/ 95.06.08–033R3, pp. 313–315, Annex C, Jun. 8, 1995.

Primary Examiner—William G. Trost
Attorney, Agent, or Firm—Hayes Soloway Hennessey Grossman & Hage PC

[57] ABSTRACT

An automatic frequency assignment method, which is capable of assigning optimum frequencies to radio ports even when the radio ports are adjacent with a shield therebetween, is provides. A plurality of radio ports around a radio port to be assigned with a frequency to sequentially transmit signals at an assignment candidate frequency. A radio port already using the same frequency as the candidate frequency measures the received signal power of these signals, and compares them with a threshold. If the result of comparison reveals that there is no radio port receiving received signal power exceeding the threshold, the assignment candidate frequency is assigned. If there is a radio port receiving the received signal power exceeding the threshold, the candidate frequency is excluded from assignment candidate frequencies. This locates a radio port covered by a shielding object, so that the same frequency is prevented from being assigned to adjacent radio ports.

9 Claims, 4 Drawing Sheets

|   | FREQUENCY (KHz) | RECEIVED POWER (mW) |
|---|---|---|
| 1 | 700 | 1.2e−3 |
| 2 | 500 | 9.2e−4 |
| 3 | 800 | 7.7e−4 |
| 4 | 900 | 3.9e−4 |
| 5 | 600 | 1.8e−4 |

_METHOD OF AUTOMATIC FREQUENCY ASSIGNMENT IN A MOBILE COMMUNICATION SYSTEM_

BACKGROUND OF THE INVENTION

1. Field of the Invention

The present invention relates to a method of automatic frequency assignment for determining frequencies assigned to radio ports constituting a cellular mobile communication system.

2. Description of the Related Art

In a cellular mobile communication system, a frequency is reused repeatedly in a service area for efficient utilization of limited number of frequencies, and the same frequency is assigned to a plurality of radio ports (or radio base stations) that are located distant from one another keeping sufficient distance from each other so as not to have radio interference. It is called frequency assignment to determine a frequency used by each radio port. One approach of frequency assignment is an automatic port frequency assignment (reference "JTC (AIR)/95.06.08-033R3, page 313–315, Annex C—Automatic Port frequency assignment").

A cellular mobile communication system employing the automatic port frequency assignment consists of a radio port control unit (hereinafter called an "RPCU") and a radio port (hereinafter called an "RP") connected to the RPCU. The RP transmits and receives radio signals to and from a personal station (hereinafter called a "PS") by using a frequency assigned to the RP. Adoption of the automatic port frequency assignment makes it easy only by measuring receiving signal power at each RP to re-assign the frequency due to a change of interference signal power being affected, which is caused by environmental changes such as increase of new RPs, buildings, or the like.

FIG. 6 is a flowchart showing a process operation in a conventional automatic port frequency assignment. In the automatic port frequency assignment, an RP to which a new frequency is to be assigned receives transmitted signals from other RPs for each frequency, and reports to an RPCU information correlating to measured received signal power with each frequency (S601). The RPCU selects a frequency that has the lowest received signal power or a frequency with the lowest interference signal power from the reported information (S602), and assigns it to the RP (S603). It performs a similar process for all RPs to assign frequencies to them (S604). The frequency assignment is achieved by repeating the operation of steps S601–S604 for a predetermined number of times to reduce the effect of error (S605).

In the method of automatic port frequency assignment just described, a frequency with the lowest received signal power from other RPs is assigned to the RP. To this end, as shown in FIG. 7, if a shield such as a building exists between the RP 101 to which a frequency is to be assigned and the RP 102 adjacent to the RP 101, the received signal power from the RP 102 becomes lowered, so that the RP 101 would be assigned with the same frequency as that of the RP 102. If the same frequency is assigned to the RP 101 and the RP 102, in the actual service, when the PS 103 being communicated with the RP 102 approaches the RP 101, the PS 103 receives a down link signal from the RP 101 as an interference signal, so that the communication quality of down link at the PS 103 is degraded. In addition, since the RP 101 receives an up link signal from the PS 103 as an interference signal, the communication quality of up link at the RP 101 is also degraded.

In addition, since the automatic port frequency assignment described above is a method for assigning a frequency taking into account only interference signal power on the down link transmitted by the RPs, it is impossible to avoid degradation of the communication quality on the up link.

SUMMARY OF THE INVENTION

The automatic frequency assignment method according to the present invention is to provide a method in which optimum frequencies, which differ from each other, are assigned to respective RPs even when the RPs are adjacent with a shield therebetween.

The present invention is an automatic frequency assignment method for a mobile communication system including a plurality of radio ports each of which constitutes a radio zone for communicating with a plurality of personal stations, and a radio port control unit connected to each of the plurality of radio ports and controlling the plurality of radio ports, the method assigning a radio frequency to be used by each of the plurality of radio ports is characterized in the following:

(1) a first radio port for assigning a frequency to be used is determined as a target radio port for frequency assignment;

(2) in this first radio port, signals transmitted from each of other radio ports are received and respective received signal power is reported with corresponding frequency to the radio port control unit;

(3) in the radio port control unit, an assignment candidate frequency with the lowest received signal power based on the received signal power reported by the first radio port is determined, and also a plurality of second radio ports in the descending order of received signal power are determined as radio ports locating near the first radio port for a verification operation performed in the following;

(4) in each of the second radio ports, a signal of the assignment candidate frequency is transmitted temporarily;

(5) on the other hand, in third radio ports in which same frequency as the assignment candidate frequency being currently used, respective signal of the assignment candidate frequency transmitted by each of second radio ports is received and the received signal power of each received signal is added, and then, the result of addition is compared with a predetermined first threshold. This is to confirm if the assignment candidate frequency transmitted near the first radio port affects to any other radio port using the same frequency. If the result of addition exceeds the first threshold, the result of comparison is reported to the radio port control unit;

(6) in the radio port control unit, if none of third radio port has reported the result of comparison that the result of addition exceeding the first threshold, it means that the verification is completed with successful and assigns the assignment candidate frequency to the first radio port; and (7) if at least one of third radio ports has reported the result of comparison that the result of addition exceeding the first threshold, it means that the verification is completed with failure, and the radio port control unit abandons to assign the assignment candidate frequency and determines another assignment candidate frequency with the lowest received signal power excluding the abandoned frequency.

In addition, the present invention is taking into account interference caused by the up link signal for frequency assignment as follows:

(1) during communication service, each radio port measures interference signal power of up link signal;

(2) if interference signal power exceeding a predetermined second threshold, the radio port reports the result of measurement to the radio port control unit;

(3) in the radio port control unit, it excludes the frequency being assigned to the radio port reporting the report from an assignment candidate frequency for the next frequency assignment; and (4) the report may be used for changing the first threshold in the radio port reporting the report to a lower value. This intends that the different frequency is selected easily as the assignment candidate frequency for the next frequency assignment.

DETAILED DESCRIPTION OF THE PREFERRED EMBODIMENTS

Now, an embodiment of the present invention will be explained with reference to the drawings.

Figure 3:
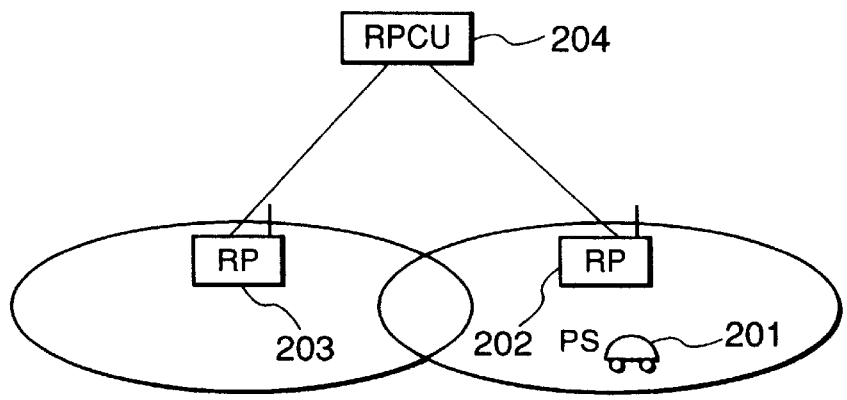
FIG. 3 is a block diagram schematically showing the configuration of a mobile communication system to which the automatic frequency assignment according to the present invention is applied.

FIG. 3 is a block diagram schematically showing the configuration of a mobile communication system in which the automatic frequency assignment method according to the present invention is applied. The system consists of a PS 201 and other PSs (not shown), RPs 202, 203 and other RPs, as well as an RPCU 204. Each RP forms a radio zone by using a frequency assigned thereto.

Figure 1:
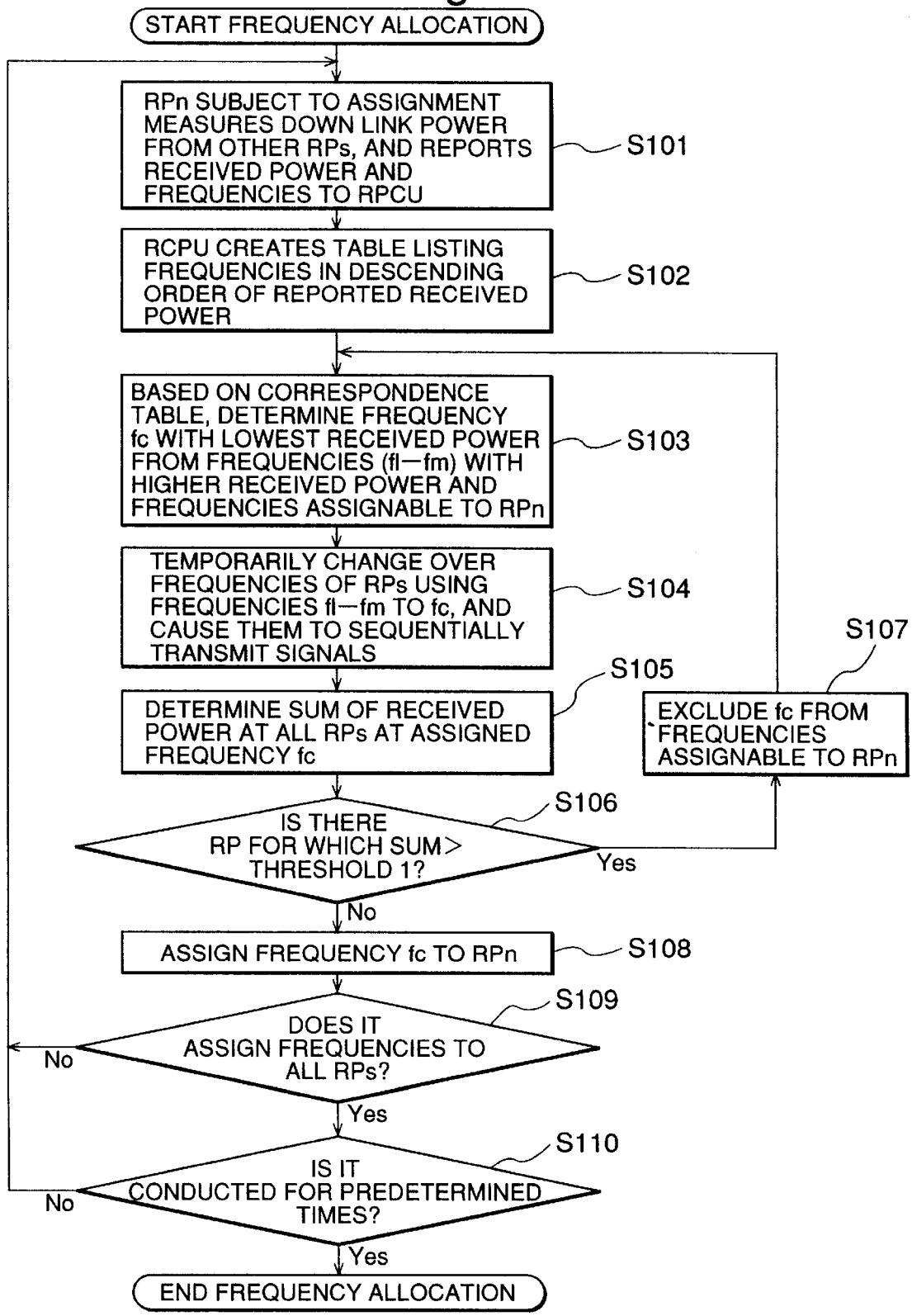
FIG. 1 is a flowchart showing the operation of automatic frequency assignment according to the present invention.
Figure 2:
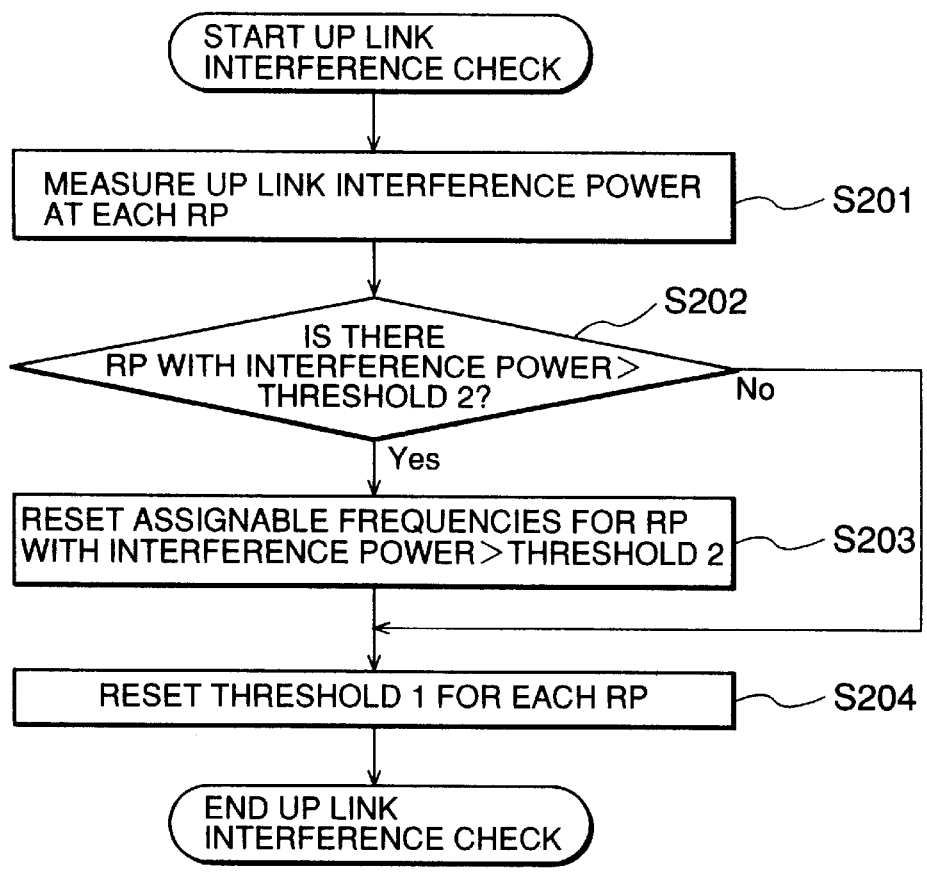
FIG. 2 is a flowchart showing the operation of interference checking for up link signal according to the present invention.

FIGS. 1 and 2 are flowcharts showing the operation of automatic frequency assignment method according to the present invention. FIG. 1 shows an operation regularly performed for assigning an RP with a frequency of signal to be transmitted, while FIG. 2 shows an operation at each RP for checking interference by an up link signal from PSs during service operation, and reflecting the checking results in the next frequency assignment operation.

The frequency assignment is performed while interrupting communication of up link by stopping the service in a low traffic condition such as at the night time.

The principle of operation of the present invention is described.

An RP to which the frequency assignment will be performed is determined (here, the RP 202 of FIG. 3 is assumed to be the one). The RPCU instructs the RP 202 to receive signals transmitted from the RP 203 and other RPs (not shown), and to measure respective received signal power for each frequency usable in the mobile communication system. The RP 202 performs this operation and reports the result to the RPCU. The RPCU, then, creates a table listing the frequencies in the descending order of their received signal power based on information of the respective reported frequencies and their received signal power reported from the RP 202.

Any number of frequencies f1–fm (where m is determined at will) are determined from a one with the highest received signal power based on the table. Also, a frequency with the lowest received signal power of those assignable to the RP 202 is determined as an assignment candidate frequency fc based on the table. This assumes that RPs being assigned with the frequencies f1–fm (received signal power is high) are those locating at the neighborhood of the RP 202, and that the frequency fc is that of a signal transmitted from an RP locating at the farthest away from the RP 202.

Here, it is intended to identify RPs locating at the neighborhood of the RP 202, and to determine a frequency not interfering other surrounding RPs. Thus, it may be allowed to include identification information of each RP in the information reported from the RP 202 to the RPCU to identify the RPs in the neighborhood. In addition, since a frequency may be repeatedly reused for a plurality of RPs each of them are located geographically away from each other, even if it finds a frequency with the lowest received signal power, if the same frequency is used by other nearer RP, and reported as information for a frequency with higher received signal power, such frequency is not determined as an assignment candidate.

Then, verification of suitability of the assignment candidate will be performed.

The RPCU instructs RPs in the neighborhood of the RP 202 and being assigned with the frequency f1–fm to sequentially and temporarily transmit a signal at the assignment candidate frequency fc. On the other hand, the RPCU instructs every RPs, which are already using (or being assigned with) the frequency fc, to receive the frequency fc transmitted from the selected RPs in the neighborhood of the RP 202 being temporarily switched, to add the respective received signal power from each RP, to compare the result of addition with a preset threshold 1, and to report the result of comparison to the RPCU.

Figure 7:
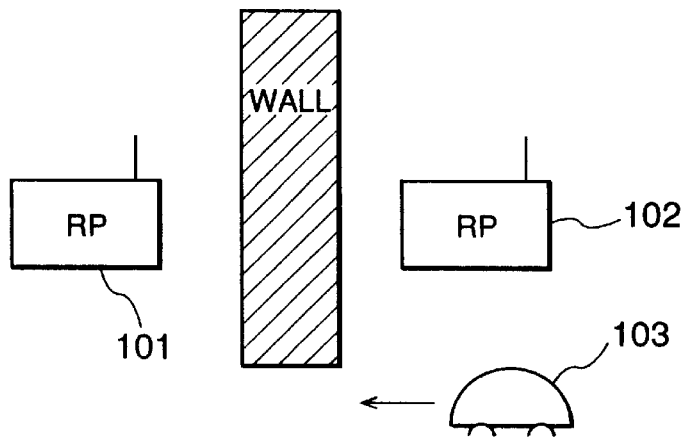
FIG. 7 is a block diagram for explaining an example of problem in conventional automatic port frequency assignment.

This is because, when the frequency fc is assigned to the RP 202 without verification, optimal frequency assignment cannot be attained when a shielding object as shown in FIG. 7 exists between the adjacent RPs.

If there is no RP whose report exceeds the threshold 1, it means that, even when the assignment candidate frequency fc is assigned to the RP 202, no RP around the RP 202 will be suffered from interference due to such assignment. Thus, the frequency fc is assigned to the RP 202. However, if there is an RP whose report exceeds the threshold 1, it means that there exists an RP which will be suffered from interference when the frequency fc is assigned to the RP 202. Then, the frequency fc is not assigned to the RP 202. In this case, the frequency fc is erased from the table. Then, the above operation is repeated by determining a frequency with the lowest received signal power from those assignable to the RP 202.

Once the frequency to be assigned to the RP 202 is determined in this manner, a next RP is determined for the next frequency assignment, and the similar operation is performed.

Once the frequency assignment completes for all RPs in the service area, the same operation is repeated in the predetermined times to reduce the effect of error.

After the frequency has been allocated with the above procedure, each RP starts its service at the assigned frequency.

Now, features of the present invention during providing the communication service will be described.

During the communication service, each RP is measuring interference signal power of up link signals transmitted from PSs. When the measured interference signal power exceeds a preset threshold 2, the fact is reported to the RPCU. The RPCU excludes the frequency currently assigned to the RP reporting that the interference signal power exceeds the threshold 2 from the frequencies assignable to that RP when assigning a frequency to it next time. Thus, by resetting frequencies assignable to an RP based on the result of measurement of interference signal power, a frequency not degrading the communication quality of up link can be used in the next frequency assignment.

In addition, two different values (an initial value and an alternate setting value of a value smaller than it) are prepared for the threshold 1 used in determining the frequency assignment for respective RPs, and the threshold 1 is changed over from the initial value to the alternate setting value for an RP in which the up link interference signal power exceeds the threshold 2.

Smaller value of the threshold 1 makes it easy for the added value of the received signal power from the surrounding RPs using the same frequency to exceed the threshold 1 in verifying the frequency assignment, and makes it difficult to assign the same frequency fc. That is, since the distance is increased between RPs to which the same frequency can be assigned, the possibility of interfering the up link communication is reduced. This can prevent such situation where the same frequency is assigned again in the next frequency assignment to RPs in which the interference signal power on the up link exceeds the threshold 2.

Now, the operation of the present invention is described in more detail.

Figures 4, 5:
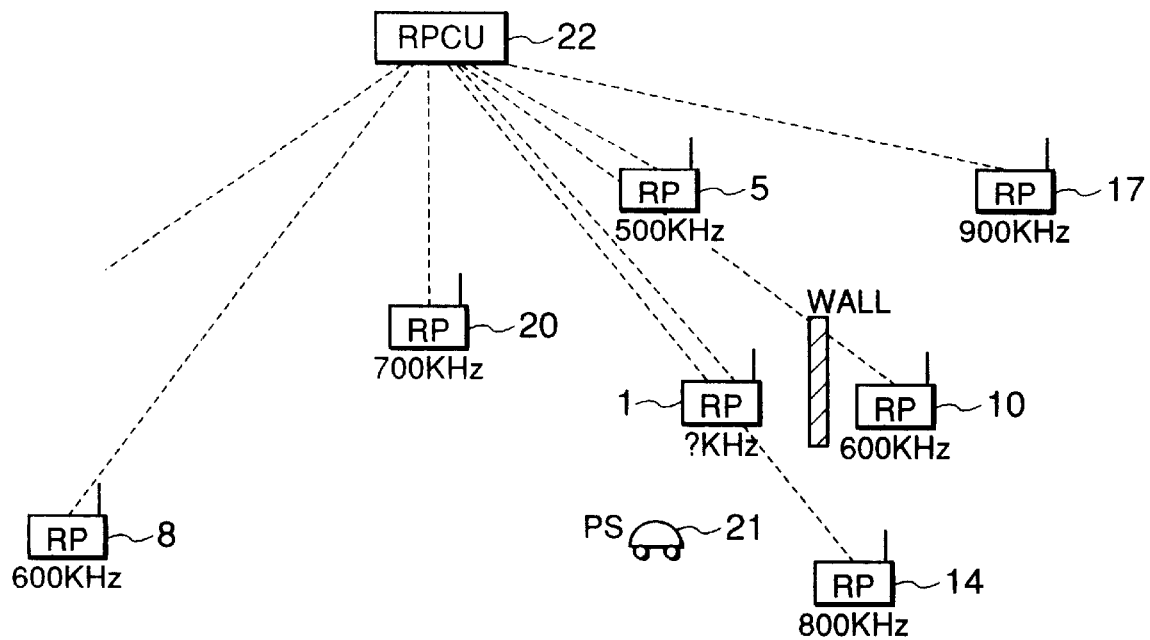
FIG. 4 is a block diagram specifically showing the configuration of a mobile communication system to which the automatic frequency assignment according to the present invention is applied.
FIG. 5 is an embodiment of table created by an RPCU according to the present invention.
Figure 6:
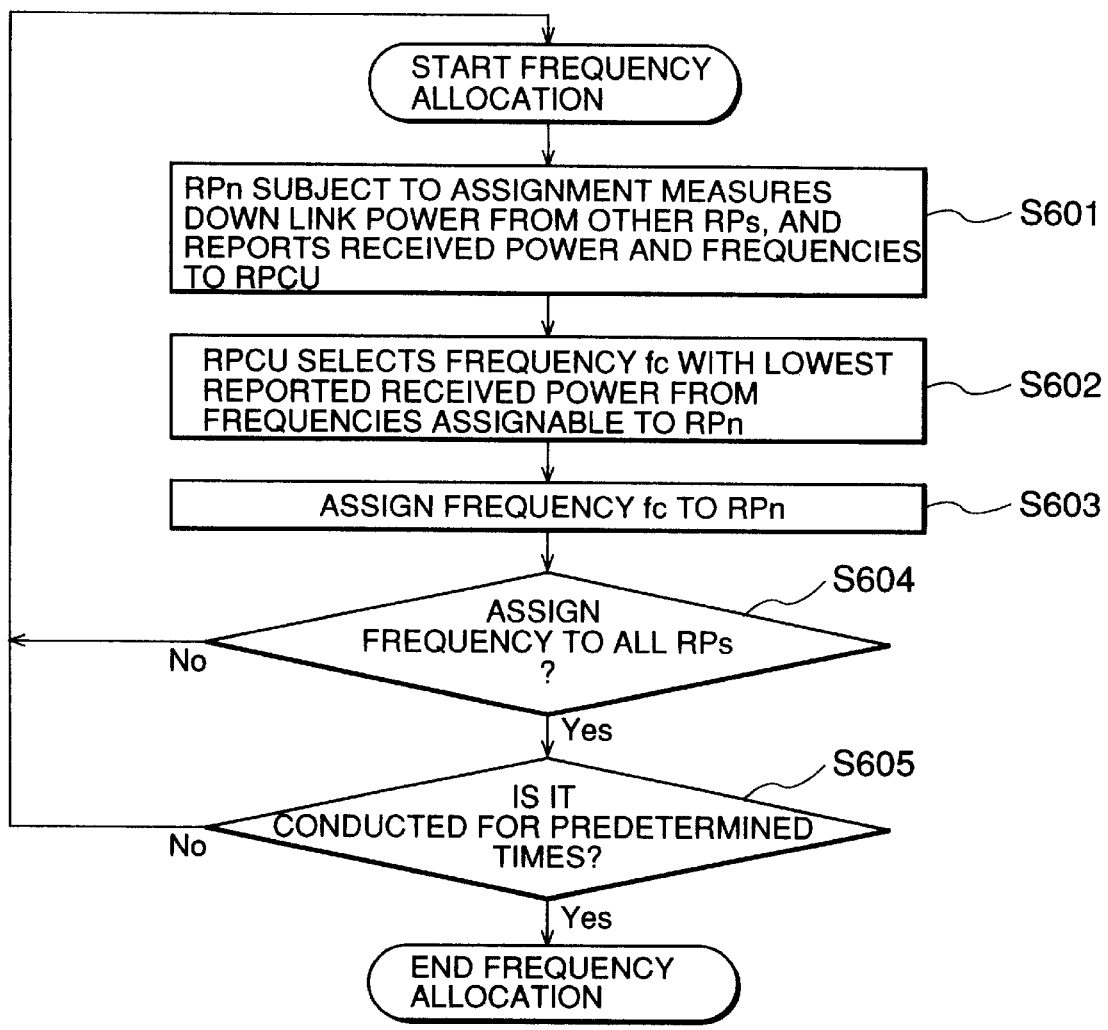
FIG. 6 is a flowchart showing the operation of conventional automatic port frequency assignment.

Referring to FIG. 4, a mobile communication system for which the automatic frequency assignment method of the present invention is used comprises 20 RPs (RP 1–RP 20, all of them are not shown), the PS 21 and other PSs (not shown), as well as the RPCU 22. It is assumed that there is a shielding object between the RP 1 and the RP 10. It is also assumed that frequencies assignable to the entire mobile communication system are five frequencies of 500 kHz, 600 kHz, 700 kHz, 800 kHz, and 900 kHz. Three frequencies are assumed to be selected in the descending order of received signal power from a table created by the RPCU. The threshold 1 can be set to two values of the initial value of 0.05 mW and 0.01 mW. In the first frequency assignment, the threshold 1 is assumed to be set to the initial value of 0.05 mW for all the RPs. The threshold 2 is assumed to be at a fixed value of 0.7 mW. The number of repetition of the operation is assumed to be ten to reduce the effect of error. The period of time for measuring the interference signal power is assumed to be 16 hours.

Description is given with the above configuration and under the above conditions by referring to the flowchart of FIG. 1.

The RP 1 to be assigned with a frequency receives respective signals transmitted from the RP 2 to the RP 20, and reports the measured received signal power and the corresponding frequency to the RPCU 22 (S101). The RPCU 22 creates a table shown in FIG. 5 listing frequencies in the descending order of received signal power based on the information reported by the RP 1 (S102). Based on the table shown in FIG. 5, top three frequencies from the highest received signal power are 700 kHz, 500 kHz, and 800 kHz. In addition, when frequencies assignable to the RP 1 is same as frequencies used by the entire mobile communication system, 600 kHz is the frequency with the lowest received signal power of those assignable to the RP 1 (S103).

Then, the RPCU 22 instructs the RP 20, the RP 5 and the RP 14 assigned with frequencies of 700 kHz, 500 kHz, and 800 kHz, respectively, to temporarily change over their frequency to 600 kHz, and to sequentially transmit a signal (S104).

First, the RP 20 changes over its frequency to 600 kHz, and transmits a signal at that frequency. The signal is received by the RP 10, the RP 8 and other RPs (not shown) to which the frequency 600 kHz is currently being assigned. The RP 20 stops the transmission, and its frequency is returned to 700 kHz. Then, the RP 5 changes over its frequency to 600 kHz, and transmits a signal at that frequency. The signal is also received by the RP 10, the RP 8 and other RPs (not shown). The RP 5 is caused to stop the transmission and to return its frequency to 500 kHz. Finally, the RP 14 changes over its frequency to 600 kHz, and transmits a signal at that frequency. The signal is received by the RP 10, the RP 8, and other RPs. The RP 14 is caused to stop the transmission, and to return its frequency to 800 kHz.

The RP 10, RP 8 and other RPs (not shown) assigned with 600 kHz add the power of signals received from the RPs 20, 5, and 14 at 600 kHz, respectively (S105).

Consequently, if the added value of received signal power is 0.04 mW at the RP 10, and those at the RP 8 and other RPs are less than it, they do not exceed the threshold 1 (0.05 mW), so that a frequency of 600 kHz can be assigned to the RP 1. However, if the added value of received signal power is the threshold 1 or less at the RP 8 and other RPs, but it is 0.1 mW at the RP 10, the threshold 1 (0.05 mW) is exceeded at the RP 10, so that a frequency of 600 kHz cannot be assigned to the RP 1. Accordingly, the process excludes 600 kHz from the frequencies assignable to the RP 1 (S107), and returns to step S103. The process selects 900 kHz that has the lowest received signal power from the frequencies assignable to the RP 1 (500 kHz, 700 kHz, 800 kHz, and 900 kHz) in the table of FIG. 5, and repeats the steps similar to the above.

If, in step S105, the received signal power added by the RP 17 assigned with 900 kHz and other RPs (not shown) does not exceed the threshold 1, a frequency of 900 kHz is assigned to the RP 1.

After a frequency has been decided for the RP 1, the frequency assignment according to steps S101–S108 is performed for the RP 2–RP 20 in the similar manner (S109). After frequencies have been assigned to all RPs, steps S101–S109 are repeated ten times to reduce the effect of error (S110). After the frequencies have been allocated in the above procedure, each RP starts its communication service at the frequency assigned thereto.

Now, the operation of interference check with the up link signal is described with reference to the flowchart of FIG. 2.

Once the communication service is resumed, each RP measures the interference signal power on the up link from the PS 21 and other PSs for a predetermined period of time, for example, from 7 a.m. to 11 p.m. (S201). If the measurement reveals that the RP 5 has 1.0 mW, the RP 1 has 1.3 mW, and the RP 17 has 0.9 mW, all of which exceed the threshold 2 (0.7 mW), the RPCU 22 excludes the frequencies currently assigned to the RPs 5, 1, and 17 from the frequencies to be assigned for the next frequency assignment (S203).

This results in frequencies assignable to the RP 5 to be 600 kHz, 700 kHz, 800 kHz, and 900 kHz, those assignable to the RP 1 to be 500 kHz, 700 kHz, and 800 kHz, and those assignable to the RP 17 to be 500 kHz, 600 kHz, 700 kHz, and 800 kHz.

At the same time, the RPCU 22 instruct to change setting of the threshold 1 for the RPs 5, 1, and 17 from the initial value to the smaller alternate value (0.01 mW). The threshold 1 for other RPs remains the initial value (0.05 mW) (S204). Since this makes severer the conditions for assigning frequencies to the RPs 5, 1, and 17, it becomes possible to avoid such situation where the same frequencies are assigned to the RP 1 and the RP 17 in the next frequency assignment, so that the up link interference signal power exceeding the threshold 2 is again received.

As described above, according to the present invention, even when the measured received signal power is at a low level on the down link because RPs are located on the both side of a shielding object, it is possible not to assign the same frequency to both RPs by causing RPs surrounding an RP to be assigned with a frequency to sequentially transmit an assignment candidate frequency fc, and measuring the received power of such signals at an RP to which the frequency fc has already been assigned, so that conventional degradation due to the interference signal power can be reduced.

In addition, during the communication service, interference signal power on the up link is measured at each RP, and the result of measurement is utilized in the next frequency assignment so as to assign a frequency with up link interference as less as possible.

While the above description assumes that the system consists of 20 RPs (RP 1–RP 20), the PS 21 and other PSs, and the RPCU 22, that there exists a shielding object between the RP 1 and the RP 10, that assignable frequencies are 500 kHz, 600 kHz, 700 kHz, 800 kHz, and 900 kHz, that the number of frequencies selected from a created table is three, that the threshold 1 is two types of 0.05 mW and 0.01 mW, that the threshold 2 is at a fixed value of 0.7 mW, that the repetition number of steps is 10, and that the interference signal power on the up link is measured for 16 hours, it is optional in the number of RP, PS and RPCU constituting the system, the location of the shielding object, the number of frequencies assignable to the entire system, the number of frequencies to be selected, the thresholds 1 and 2, the repetition number of steps, and the measurement interval for interference signal power on the up link, and they are not limited to the above description.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. An automatic frequency assignment method for a mobile communication system including a plurality of radio ports each of which constitutes a radio zone for communicating with a plurality of personal stations, and a radio port control unit connected to each of said plurality of radio ports and controlling said plurality of radio ports, said method assigning a radio frequency to be used by each of the plurality of radio ports comprising steps of:

receiving signals at a first radio port to which a frequency to be used thereat will be assigned, said signals being transmitted from each of the other radio ports, and reporting the received signal power associated with corresponding frequency of each received signal to said radio port control unit;

determining, at said radio port control unit, an assignment candidate frequency having the lowest received signal power based on the received signal power reported by said first radio port;

transmitting, to said first radio port, a signal of said assignment candidate frequency from a plurality of selected radio ports located near said first radio port;

verifying if any said radio port is being interfered with by said assignment candidate frequency by comparing said assignment candidate frequency with a threshold level;

assigning said assignment candidate frequency to said first radio port if none of the selected radio ports do not report that said comparing exceeds said threshold; and not assigning said assignment candidate frequency to said first radio port if at least one said selected radio port reports that said comparing exceeds said threshold;

and if said assignment candidate frequency is not assigned, determining at least one other assignment candidate frequency having the second lowest received signal power, and verifying an interference in any of said selected radio ports affected by the newly determined assignment candidate frequency.

2. The automatic frequency assignment method for a mobile communication system as set forth in claim 1, wherein said method being repeated for all radio ports in the mobile communication system.

3. The automatic frequency assignment method for a mobile communication system as set forth in claim 2, wherein said method being repeated for a predetermined number of times before fixing a frequency assignment for all radio ports in the mobile communication system.

4. An automatic frequency assignment method for a mobile communication system including a plurality of radio ports each of which constitutes a radio zone for communicating with a plurality of personal stations, and a radio port control unit connected to each of said plurality of radio ports and controlling said plurality of radio ports, said method assigning a radio frequency to be used by each of the plurality of radio ports comprising steps of:

determining a first radio port for assigning a frequency to be used;

receiving signals, at said first radio port, transmitted from each of the other radio ports, and reporting a received signal power with corresponding frequency of each received signal to said radio port control unit;

determining, at said radio port control unit, a plurality of second radio ports in the descending order of received signal power and determining an assignment candidate frequency having the lowest received signal power based on the received signal power reported by said first radio port;

transmitting a signal of said assignment candidate frequency from each of said second radio ports;

receiving said signals of said assignment candidate frequency, at third radio ports in which same frequency as said assignment candidate frequency being currently used, transmitted by said plurality of second radio ports, adding the received signal power of each received signal, comparing the results with a predetermined first threshold, and reporting the result of said comparison to said radio port control unit if the result of addition exceeds said first threshold; and assigning said assignment candidate frequency to said first radio port if none of said third radio ports report to said radio port control unit that the results of said addition exceeds said first threshold.

5. The automatic frequency assignment method for a mobile communication system as set forth in claim 4, said method further comprising steps of:

abandoning said assignment candidate frequency if at least one of said third radio ports report to said radio port control unit that the results of said addition exceeds said first threshold;

determining a next assignment candidate frequency with the next lowest received signal power based on the received signal power reported by said first radio port;

transmitting a signal of said next assignment candidate frequency to each of said second radio ports;

receiving said signals of said next assignment candidate frequency, at said third radio ports, transmitted by said plurality of second radio ports, adding the received signal power of each received signal, comparing the result of addition with said first threshold, and reporting the result of comparison to said radio port control unit if the result of said addition exceeds said first threshold; and assigning said next assignment candidate frequency to said first radio port if none of said third radio ports report to said radio port control unit that the result of said addition exceeds said first threshold.

6. The automatic frequency assignment method for a mobile communication system as set forth in claim 4, said method further comprising steps of:

measuring the interference signal power of an up link signal at each of said radio ports during communication service being provided;

reporting the measurement to said radio port control unit if the interference signal power exceeds a predetermined second threshold;

changing said first threshold in response to said measurement to a lower value.

7. The automatic frequency assignment method for a mobile communication system as set forth in claim 4, wherein said method being repeated for all radio ports in the mobile communication system.

8. An automatic frequency assignment method for a mobile communication system including a plurality of radio ports each of which constitutes a radio zone for communicating with a plurality of personal stations, and a radio port control unit connected to each of said plurality of radio ports and controlling said plurality of radio ports, said method assigning a radio frequency to be used by each of the plurality of radio ports comprising steps of:

measuring interference signal power of an up link signal at each of said radio ports during communication service being provided to at least one of said plurality of personal stations;

reporting the measurement to said radio port control unit if the interference signal power exceeds a predetermined threshold;

excluding the frequency associated with said measurement from being assigned as an assignment candidate frequency to a radio port for the next frequency assignment performed by said radio port control unit.

9. The automatic frequency assignment method for a mobile communication system as set forth in claim 8, wherein said method being repeated for all radio ports in the mobile communication system.

* * * * *